US008973459B2

(12) United States Patent
Fukudome et al.

(10) Patent No.: US 8,973,459 B2
(45) Date of Patent: Mar. 10, 2015

(54) PARALLEL LINK ROBOT

(71) Applicant: Kabushiki Kaisha Yaskawa Denki, Fukuoka (JP)

(72) Inventors: Kazuhiro Fukudome, Fukuoka (JP); Nobuhiko Mihara, Fukuoka (JP)

(73) Assignee: Kabushiki Kaisha Yaskawa Denki, Kitakyushu-Shi, Fukuoka (JP)

( * ) Notice: Subject to any disclaimer, the term of this patent is extended or adjusted under 35 U.S.C. 154(b) by 84 days.

(21) Appl. No.: 13/756,640

(22) Filed: Feb. 1, 2013

(65) Prior Publication Data

US 2013/0205932 A1 Aug. 15, 2013

(30) Foreign Application Priority Data

Feb. 3, 2012 (JP) .................................. 2012-022164

(51) Int. Cl.
*B25J 17/02* (2006.01)
*B25J 17/00* (2006.01)
*B25J 18/00* (2006.01)
*B25J 9/00* (2006.01)

(52) U.S. Cl.
CPC .............. *B25J 18/00* (2013.01); *B25J 17/0266* (2013.01); *B25J 9/003* (2013.01); *B25J 9/0051* (2013.01); *Y10S 901/27* (2013.01)
USPC ........................................ 74/490.01; 901/27

(58) Field of Classification Search
CPC ..... B25J 17/00; B25J 17/0266; B25J 17/0275
USPC ........................ 74/490.01, 490.05; 901/14, 27
See application file for complete search history.

(56) References Cited

U.S. PATENT DOCUMENTS

| 5,333,514 | A  | * | 8/1994 | Toyama et al. ............. 74/490.06 |
| 6,419,211 | B1 | * | 7/2002 | Hvittfeldt et al. ............... 267/69 |
| 7,798,036 | B2 | * | 9/2010 | Okazaki ..................... 74/490.05 |
| 8,621,953 | B2 | * | 1/2014 | Hombach et al. .......... 74/490.01 |
| 2001/0010630 | A1 | | 8/2001 | Umemoto |
| 2010/0037721 | A1 | * | 2/2010 | Nakao et al. ............... 74/490.05 |
| 2010/0263471 | A1 | | 10/2010 | Weber |
| 2014/0090508 | A1 | * | 4/2014 | Hirano ........................ 74/490.05 |

FOREIGN PATENT DOCUMENTS

| JP | S54-136444 | 9/1979 |
| JP | S64-29520 | 2/1989 |
| JP | H05-149314 | 6/1993 |

(Continued)

OTHER PUBLICATIONS

Extended European Search Report dated May 6, 2014, issued in corresponding European Application No. 13152368.0-1712.

(Continued)

*Primary Examiner* — Justin Krause
(74) *Attorney, Agent, or Firm* — Bacon & Thomas, PLLC

(57) ABSTRACT

A parallel link robot includes a first arm including a first joint portion; a second arm including a second joint portion swingably engaging with the first joint portion, the second arm being connected to the first arm to make up a link mechanism; and a biasing mechanism unit which biases the second joint portion toward the first joint portion. The biasing mechanism unit includes a connection member attached to the second arm and the connection member includes a locking portion configured to lock the connection member to the second arm.

12 Claims, 7 Drawing Sheets

(56) References Cited

FOREIGN PATENT DOCUMENTS

| | | |
|---|---|---|
| JP | H08-000403 | 2/1996 |
| JP | 2001-152727 | 6/2001 |
| JP | 2001-194534 A | 7/2001 |
| JP | 2009-221844 | 10/2009 |
| JP | 2010-247324 | 11/2010 |
| JP | 2011-194534 | 10/2011 |

OTHER PUBLICATIONS

Japanese Office Action dated Dec. 24, 2013 issued in corresponding Japanese application No. 2012-022164 and the English translation thereof.

Chinese Office Action dated Nov. 2, 2014 issued in corresponding Chinese application No. 201310043417.1 and the English translation thereof.

* cited by examiner

PARALLEL LINK ROBOT

CROSS-REFERENCE TO RELATED APPLICATION

The present disclosure contains subject matter related to that disclosed in Japanese Priority Patent Application No. 2012-022026 filed on Feb. 3, 2012. The contents of this application are incorporated herein by reference in their entirety.

BACKGROUND OF THE INVENTION

1. Field of the Invention

The present invention relates to a parallel link robot and, more particularly, to a parallel link robot having joint portions.

2. Description of the Related Art

In the past, there is known a parallel link robot that includes a plurality of arms arranged side by side and capable of being bent and stretched in joint portions (see, e.g., Japanese Patent Application Publication No. 2011-194534).

JP2011-194534A discloses a parallel link robot including a first arm having a first joint portion, a second arm having a second joint portion engaging with a first engagement portion, and a biasing mechanism unit for biasing the second joint portion toward the first joint portion. Each of the first joint portion and the second joint portion includes a spherical portion and a concave portion engaging with the spherical portion and makes up a ball joint mechanism. The biasing mechanism unit biases the concave portion against the spherical portion, thereby keeping the concave portion and the spherical portion engaged with each other. The parallel link robot is configured such that, if an external force larger than the biasing force of the biasing mechanism unit is applied to the arms, the first joint portion and the second joint portion are disengaged from each other. This helps prevent the parallel link robot and other equipment from getting damaged during occurrence of an abnormality.

The biasing mechanism unit of the parallel link robot disclosed in JP2011-194534A includes a closed-bottom cylindrical bush (a first connection member) attached to a joint section of the second arm having the second joint portion, the bush fitted to a cylindrical columnar engaged pin provided in the joint section so that the bush can cover the engaged pin, a hook-shaped connector engaging with the bush, and a coil spring for biasing the connector toward the first joint portion.

In the parallel link robot disclosed in JP2011-194534A, however, the biasing mechanism unit is attached through the bush (the first connection member) fitted to the engaged pin of the joint section. Therefore, if the first joint portion and the second joint portion are disengaged from each other under the action of an external force, the bush is removed from the engaged pin. This poses a problem in that the biasing mechanism unit is easily removed. In the event that the parallel link robot is used in picking foodstuffs, medicines, cosmetics and so forth, the removed components may possibly be mixed into a production line. From the viewpoint of sanitation, it is required to reduce the likelihood of removal of the components as far as possible.

SUMMARY OF THE INVENTION

In view of the problems noted above, it is an object of the present invention to provide a parallel link robot capable of reducing the likelihood of removal of components.

In accordance with one aspect of the present invention, there is provided a parallel link robot, including: a first arm including a first joint portion; a second arm including a second joint portion swingably engaging with the first joint portion, the second arm being connected to the first arm to make up a link mechanism; and a biasing mechanism unit which biases the second joint portion toward the first joint portion, wherein the biasing mechanism unit includes a connection member attached to the second arm, the connection member including a locking portion configured to lock the connection member to the second arm.

In the parallel link robot in accordance with one aspect of the present invention, the biasing mechanism unit is configured to include the first connection member attached to the second arm. The first connection member is configured to include the first locking portion arranged to lock the first connection member to the second arm. Accordingly, the first connection member can be locked to the second arm by the first locking portion, and the biasing mechanism unit can be attached to the second arm by the first connection member locked to the second arm. Therefore, even if the first joint portion of the first arm and the second joint portion of the second arm are disengaged from each other, the first connection member of the biasing mechanism unit is hardly removed from the second arm due to the provision of the first locking portion. It is therefore possible to inhibit the biasing mechanism unit from being removed together with the first connection member. As a result, it becomes possible to reduce the likelihood of removal of components.

With the present invention, as stated above, it is possible to provide a parallel link robot capable of reducing the likelihood of removal of components.

DESCRIPTION OF THE EMBODIMENTS

Embodiments of the present invention will now be described with reference to the accompanying drawings which form a part hereof.

First Embodiment

Referring to FIGS. 1 through 6, description will be made on the configuration of a parallel link robot 100 in accordance with a first embodiment of the present invention.

Figure 1:
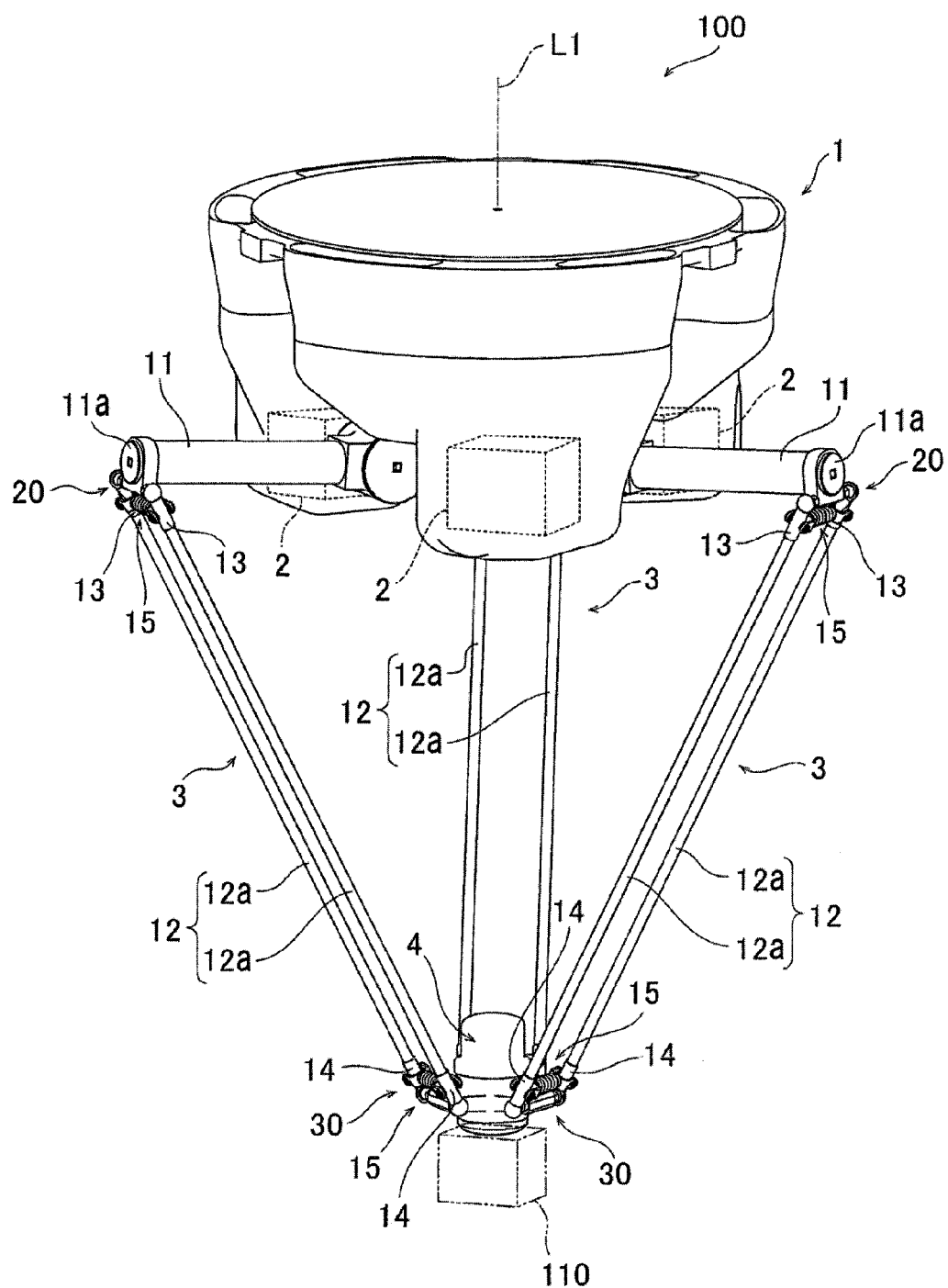
FIG. 1 is a schematic view showing the overall configuration of a parallel link robot according to first and second embodiments of the present invention.

As shown in FIG. 1, the parallel link robot 100 in accordance with the first embodiment includes a base unit 1, three servo motors 2 arranged in the base unit 1, three arm units 3 respectively driven by the three servo motors 2, and a head unit 4 to which an end effecter 110 is attached.

The base unit 1 is attached to a fixing surface of a ceiling or the like. The three servo motors 2 are arranged within the base unit 1. When seen in a plan view, the three servo motors 2 and the three arm units 3 are arranged at an equal angular interval (at an interval of 120 degrees) around the center axis L1 of the base unit 1 extending in the vertical direction.

The three arm units 3 are identical in configuration with one another. More specifically, each of the arm units 3 includes an upper arm 11 and a lower arm 12 connected to the upper arm 11 so as to make up a link mechanism. The upper arm 11 and the lower arm 12 are examples of a "first arm" and a "second arm" of the present invention. The upper arm 11 has a base end portion attached to an output shaft of the corresponding servo motor 2. The upper arm 11 is configured to swing (rotate) in the up-down direction (Z-direction) on a vertical plane. The lower arm 12 has a base end portion connected to a tip end portion 11a of the upper arm 11 through a joint mechanism unit 20. The lower arm 12 has a tip end portion connected to the head unit 4 through a joint mechanism unit 30.

Figure 2:
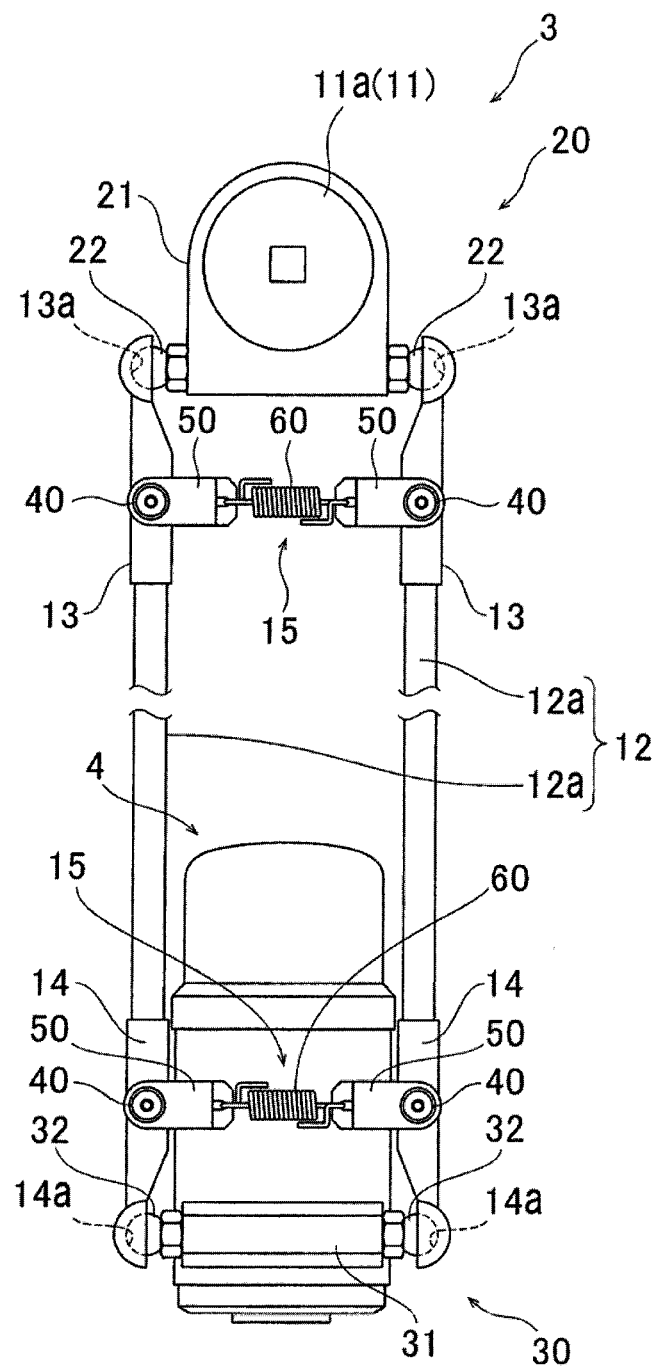
FIG. 2 is a schematic view for explaining the configuration of a joint mechanism unit of the parallel link robot according to the first and second embodiments of the present invention.

As shown in FIG. 2, the lower arm 12 includes a pair of cylindrical columnar poles 12a arranged between the joint mechanism units 20 and 30 in a parallel relationship with each other and two pairs of sockets 13 and 14 respectively arranged at the opposite ends of the poles 12a. The parallel link robot 100 in accordance with the first embodiment of the present invention includes two biasing mechanism units 15 arranged in a one-to-one correspondence to the two pairs of sockets 13 and 14.

As shown in FIG. 2, the joint mechanism units 20 and 30 have the same ball-joint-type joint structure. The upper arm 11 includes a pair of spherical portions 22. More specifically, the spherical portions 22 are fixedly attached to the tip end portion 11a of the upper arm 11 through a bracket 21. The spherical portions 22 are one example of a "first joint portion" of the present invention. The spherical portions 22 are arranged on the opposite side surfaces of the bracket 21 to protrude in the opposite directions (outward) from each other. The sockets 13 are fixedly attached to the poles 12a in one end portions (the end portions near the upper arm 11) of the poles 12a. The sockets 13 have hemispherical concave portions 13a at one end portions thereof (one end portions in the upper arm 11 side). The spherical portions 22 are inserted into the concave portions 13a to enable the sockets 13 to slidably (swingably) engage with the upper arm 11. The concave portions 13a are one example of a "second joint portion" of the present invention. The sockets 13 are opposed to each other and are arranged so that the concave portions 13a thereof can grip the spherical portions 22 at the outer sides of the spherical portions 22. Each of the biasing mechanism units 15 is arranged between the sockets 13 of the lower arm 12. Each of the biasing mechanism units 15 biases the concave portions 13a of the sockets 13 toward the spherical portions 22 by pulling the sockets 13 toward each other together with the poles 12a.

In the joint mechanism unit 30, a pair of spherical portions 32 is fixedly attached to the head unit 4 through an attachment member 31. The spherical portions 32 are arranged in the opposite end portions of the attachment member 31 so as to protrude outward. In the other end portions (the end portions near the head unit 4) of the poles 12a of the lower arm 12, the sockets 14 are fixedly attached to the poles 12a. The sockets 14 have hemispherical concave portions 14a at one end portions thereof (one end portions opposite to the upper arm 11 side). The spherical portions 32 are inserted into the concave portions 14a to enable the sockets 14 to slidably (swingably) engage with the head unit 4. A biasing mechanism unit 15 for biasing the sockets 14 (the poles 12a) toward each other is arranged in the other end portions of the poles 12a. The spherical portions 32, the sockets 14 and the concave portions 14a of the joint mechanism unit 30 correspond, respectively, to the spherical portions 22, the sockets 13 and the concave portions 13a of the joint mechanism unit 20. The spherical portions 32 and the concave portions 14a are examples of a "first joint portion" and a "second joint portion" of the present invention.

In the first embodiment, the biasing mechanism unit 15 includes first connection members 40 attached to the opposite sides (see FIG. 3) of the respective sockets 13 (14) of the lower arm 12, a pair of second connection members 50 respectively attached to the first connection members 40, and a spring member 60 whose opposite ends engage with the second connection members 50. The structures for attachment of the biasing mechanism units 15 to the sockets 13 and 14 are identical with each other. Therefore, only the structure for attachment of the biasing mechanism unit 15 to the sockets 13 will be described herein below.

Figure 3:
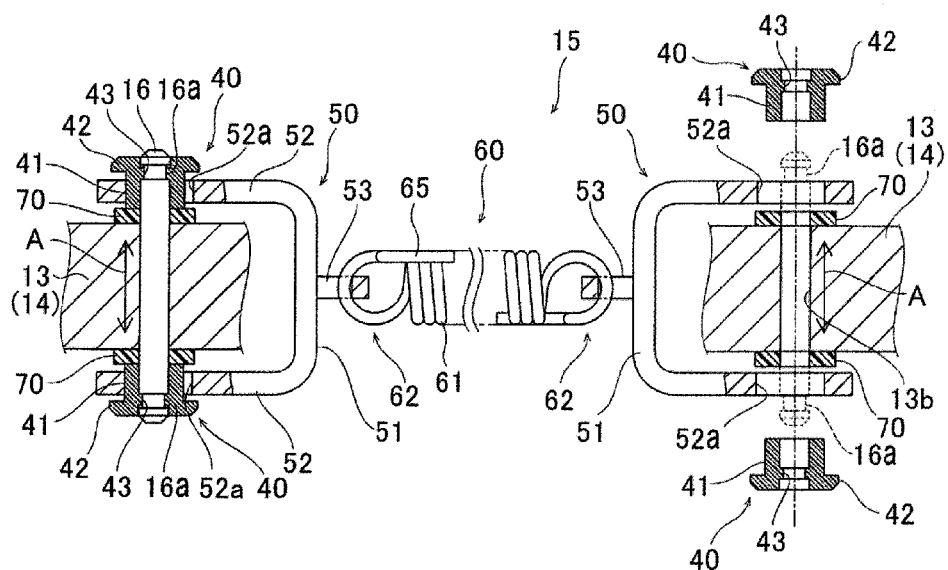
FIG. 3 is a schematic view for explaining the configuration of a biasing mechanism unit of the parallel link robot according to the first embodiment of the present invention.
Figure 5:
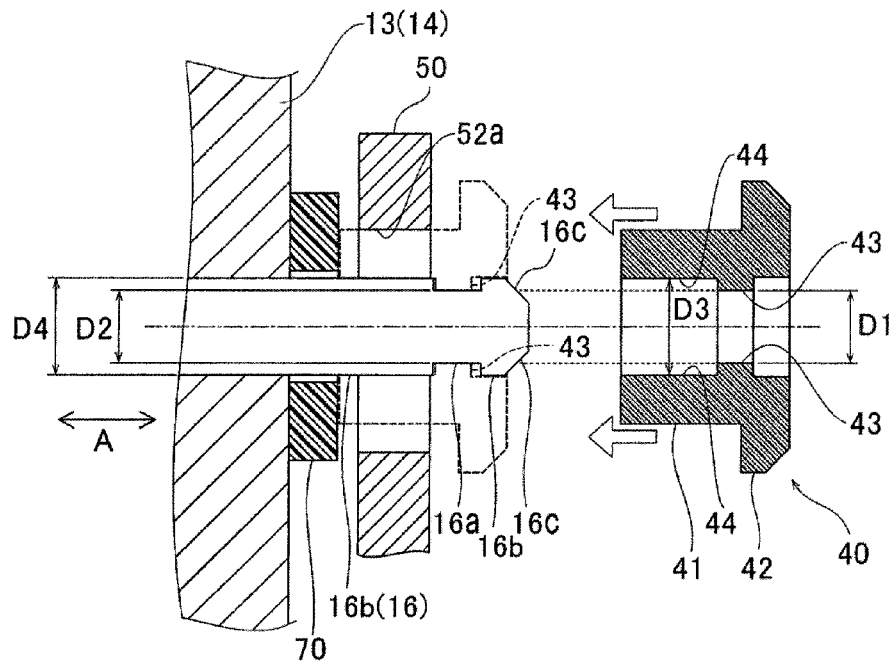
FIG. 5 is a schematic enlarged section view for explaining a first connection member of the biasing mechanism unit shown in FIG. 3.

The lower arm 12 includes attachment pins 16 for attaching the first connection members 40. As shown in FIGS. 3 and 5, each of the first connection members 40 has a hollow tube shape so that each of the first connection members 40 can be fitted to the attachment pins 16 arranged in the sockets 13. Each of the attachment pins 16 is arranged to pass through an insertion hole 13b of each of the sockets 13 and to protrude toward the opposite sides of each of the sockets 13. The first connection members 40 are fitted to the opposite ends of each of the attachment pins 16 protruding from each of the sockets 13. Each of the first connection members 40 includes a cylindrical shaft portion 41 and a removal-preventing portion 42 larger in outer dimension than the shaft portion 41. The shaft portion 41 and the removal-preventing portion 42 are one-piece formed with each other. A ring-shaped portion 52 of each of the second connection members 50 is fitted to the outer surface of the shaft portion 41. The removal-preventing portion 42 is formed at the outer side of the shaft portion 41 in the axial direction (in the direction indicated by an arrow A). The removal-preventing portion 42 is one example of a "second removal-preventing portion" of the present invention.

In the present embodiment, an annular protrusion portion 43 protruding inward is one-piece formed on the inner circumferential surface of each of the first connection members 40. The protrusion portion 43 is configured to engage with an annular groove portion 16a formed on the outer circumferential surface of each of the attachment pins 16, thereby locking each of the first connection members 40 to each of the sockets 13 (each of the attachment pins 16) of the lower arm 12. More specifically, as shown in FIG. 5, the inner diameter D1 of the protrusion portion 43 of each of the first connection members 40 is substantially equal to the outer diameter D2 of the groove portion 16a of each of the attachment pins 16. The inner diameter D3 of the inner circumferential surface 44 of each of the first connection members 40 other than the protrusion portion 43 is substantially equal to the outer diameter D4 of the outer circumferential surface 16b of each of the attachment pins 16 other than the groove portion 16a. The first connection members 40 are made of an elastically deformable resin superior in wear resistance (e.g., polyacetal (POM)). The attachment pins 16 are made of, e.g., stainless steel. Each of the first connection members 40 is fitted to each of the attachment pins 16 while causing elastic deformation of the protrusion portion 43. As the protrusion portion 43 is restored from the elastic deformation, the protrusion portion 43 and the groove portion 16a come into engagement with each other in the axial direction. The protrusion portion 43 and the groove portion 16a are examples of a "first locking portion" and a "second locking portion" of the present invention.

A first slant surface portion 16c whose width (diameter) grows smaller toward the tip end of each of the attachment pins 16 is provided in the tip end portion of each of the attachment pins 16. The first slant surface portion 16c is formed to make contact with the protrusion portion 43 of each of the first connection members 40 when each of the first connection members 40 is fitted to each of the attachment pins 16. More specifically, the outer diameter at the tip end of the first slant surface portion 16c (the outer diameter of each of the attachment pins 16) where the first slant surface portion 16c has a smallest diameter is smaller than the inner diameter D1 of the protrusion portion 43 of each of the first connection members 40. The outer diameter at the inner end of the first slant surface portion 16c in the axial direction (the direction indicated by an arrow A) where the first slant surface portion 16c has a largest diameter is equal to the outer diameter D4 of the outer circumferential surface 16b (larger than the inner diameter D1 of the protrusion portion 43 of each of the first connection members 40).

Figure 4:
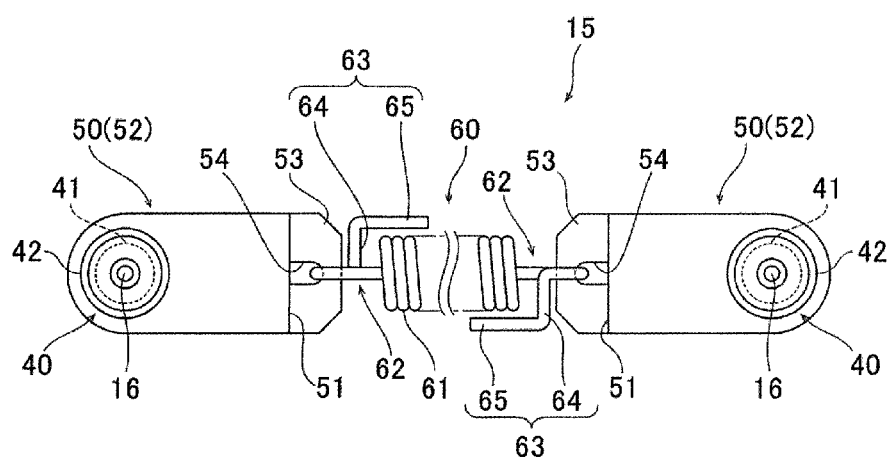
FIG. 4 is a side view schematically illustrating the biasing mechanism unit of the parallel link robot according to the first embodiment of the present invention.

The second connection members 50 are made of metal, e.g., stainless steel. As shown in FIGS. 3 and 4, each of the second connection members 50 includes a base portion 51 and a pair of ring-shaped portions 52 bifurcated from the base portion 51. The base portion 51 is provided with an attachment portion 53 protruding in the opposite direction from the ring-shaped portions 52. The attachment portion 53 has an attachment hole 54 (see FIG. 4) to which the spring member 60 is attached.

Figure 6:
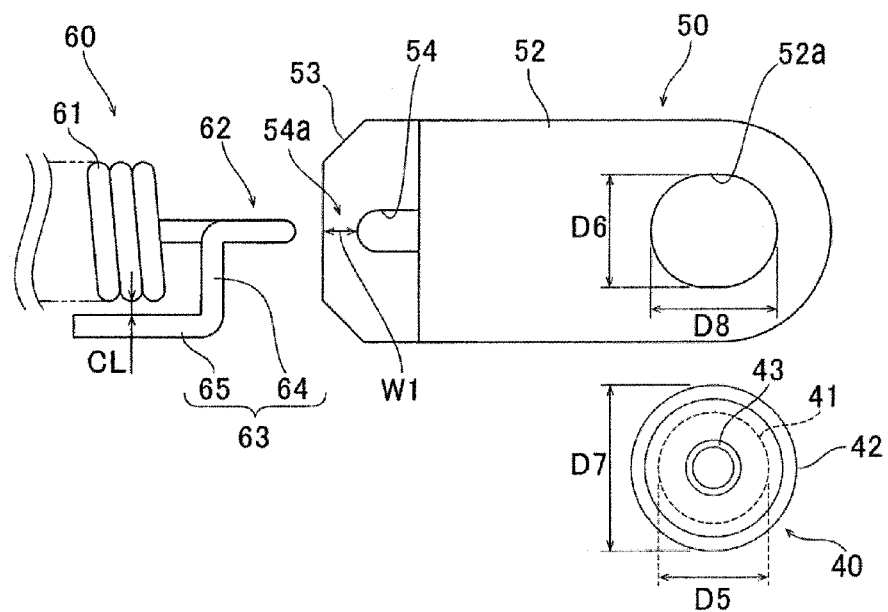
FIG. 6 is a schematic enlarged view for explaining the respective components of the biasing mechanism unit shown in FIG. 4.

The ring-shaped portions 52 of each of the second connection members 50 are identical in shape and are arranged at the opposite sides of each of the sockets 13 (see FIG. 3) interposed therebetween. As shown in FIGS. 3 and 6, an elliptical hole portion 52a is formed in the tip end region of each of the ring-shaped portions 52. Each of the second connection members 50 and each of the first connection members 40 are brought into engagement with each other by inserting the shaft portions 41 of the first connection members 40 in the hole portions 52a of the ring-shaped portions 52 at the opposite sides of each of the sockets 13. As shown in FIG. 6, the outer diameter D5 of the shaft portion 41 of each of the first connection members 40 is smaller than the inner diameter (the shorter diameter) D6 of the hole portion 52a. The outer diameter D7 of the removal-preventing portion 42 of each of the first connection members 40 is larger than the inner diameter (the longer diameter) D8 of the hole portion 52a. As shown in FIG. 3, the ring-shaped portions 52 engage with the shaft portions 41 of the first connection members 40. The movement of the ring-shaped portions 52 in the axial direction (the direction indicated by an arrow A) (the removal of the ring-shaped portions 52 from the first connection members 40) is inhibited by the removal-preventing portions 42 of the first connection members 40. Washers 70 made of a resin (POM) just like the first connection members 40 are arranged at the opposite sides of the ring-shaped portions 52 from the removal-preventing portions 42, thereby preventing the stainless-made sockets 13 from making contact with the second connection members 50.

As shown in FIG. 4, the spring member 60 is formed of a tension coil spring that includes a body portion 61 and engagement portions 62 provided at the opposite ends of the body portion 61. The spring member 60 is brought into engagement with the second connection members 50 by inserting the engagement portions 62 into the attachment holes 54 of the second connection members 50. In the first embodiment, the engagement portions 62 are formed into an arc shape and are provided with removal-preventing portions 63 for inhibiting the engagement portions 62 from disengaging from the second connection members 50. The removal-preventing portions 63 are one-piece formed with the engagement portions 62. The body portion 61 and the removal-preventing portions 63 are examples of a "spring body portion" and a "first removal-preventing portion" of the present invention.

The removal-preventing portions 63 are bent in a plurality of different directions. Each of the removal-preventing portions 63 includes a first upstanding section 64 bent from each of the engagement portions 62 to extend substantially upright and a second upstanding section 65 bent from the first upstanding section 64 at a substantially right angle to extend along the body portion 61. The spring member 60 comes into engagement with the second connection members 50 in a state that the engagement portions 62 are inserted into the attachment holes 54 with the second upstanding section 65 and the first upstanding section 64 passing through the attachment holes 54 in the named order.

In the first embodiment, as shown in FIG. 6, the spring member 60 is formed such that the clearance CL between the body portion 61 and the second upstanding section 65 (the removal-preventing portion 63) becomes smaller than the width W1 of the edge portion 54a of the attachment hole 54 of the attachment portion 53 (the portion surrounding the attachment hole 54) in the direction orthogonal to the attachment direction. The width W1 is the width of the narrowest region of the edge portion 54a.

With this configuration, as shown in FIG. 2, the spring member 60 of the biasing mechanism unit 15 biases the concave portions 13a (14a) of the sockets 13 (14) against the spherical portions 22 (32) through the second connection members 50 and the first connection members 40 (and the attachment pins 16). Thus, the sockets 13 (14) are pressed against the spherical portions 22 (32) from the outer sides and are capable of stably holding the spherical portions 22 (32). Accordingly, the upper arm 11 and the lower arm 12 are connected through the joint mechanism unit 20 so as to make bending and stretching motions. The lower arm 12 and the head unit 4 are swingably connected through the joint mechanism unit 30.

In the joint mechanism unit 20 (or the joint mechanism unit 30), the engagement state is maintained by the biasing force of the biasing mechanism unit 15. Therefore, if an external force larger than the biasing force of the biasing mechanism unit 15 is applied to the lower arm 12 or the end effecter 110, e.g., if the lower arm 12 or the end effecter 110 interferes with an external object for any reason, the spherical portions 22 (32) and the concave portions 13a (14a) of the sockets 13 (14) are disengaged from each other (The joint mechanism unit 20 (or the joint mechanism unit 30) is separated). Accordingly, it is possible to prevent the interfering part (the lower arm 12, the end effecter 110 or the external object) for getting damaged.

The head unit 4 is supported by the three arm units 3. Pursuant to the combination of the postures of the three arm units 3, the head unit 4 is moved to assume an arbitrary posture in an arbitrary position. Thus, the end effecter 110 attached to the head unit 4 can assume an arbitrary posture in an arbitrary position.

Next, a method of attaching the biasing mechanism unit 15 in accordance with the first embodiment will be described with reference to FIGS. 3 through 7.

First, description will be made on a method of attaching the first connection members 40 and the second connection members 50. As shown in FIG. 3, the ring-shaped portions 52 (the hole portion 52a) of each of the second connection members 50 are arranged at the opposite sides of the insertion hole 13b of each of the sockets 13. The washers 70 are arranged between each of the sockets 13 and the ring-shaped portions 52. In this state, each of the attachment pins 16 is inserted through the insertion hole 13b of each of the sockets 13, the two washers 70, and the ring-shaped portions 52 (see a broken line at the right side in FIG. 3). Then, the first connection members 40 are fitted to the opposite ends of each of the attachment pins 16.

When fitting the first connection members 40, as shown in FIG. 5, the protrusion portion 43 on the inner circumferential surface of each of the first connection members 40 makes contact with the first slant surface portion 16c formed in the tip end portion of each of the attachment pins 16. The protrusion portion 43 is elastically deformed so as to climb on the first slant surface portion 16c. This makes it possible to fit the first connection members 40 without having to apply an excessively large pressing force.

Thereafter, if the protrusion portion 43 reaches the groove portion 16a of each of the attachment pins 16, the protrusion portion 43 of each of the first connection members 40 is restored from the elastic deformation and comes into engagement with the groove portion 16a of each of the attachment pins 16 (see a broken line in FIG. 5). As a consequence, the first connection members 40 are locked to each of the attachment pins 16.

Figure 7:
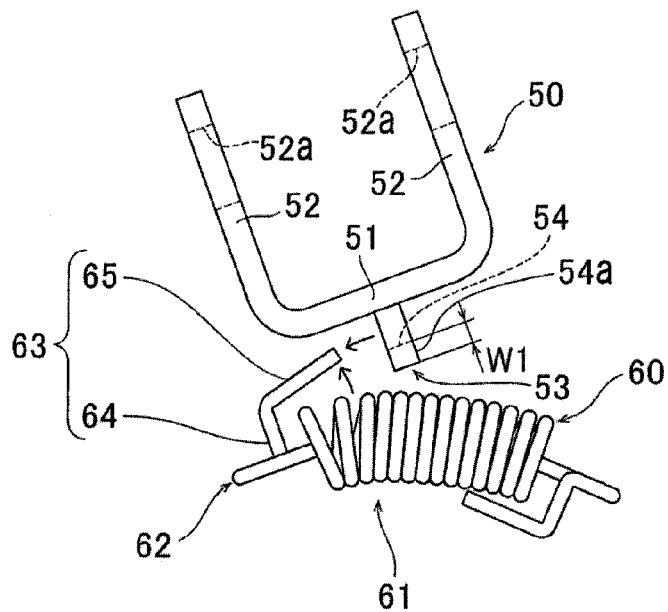
FIG. 7 is a schematic view for explaining how to couple the second connection member and the spring member shown in FIG. 6.

Next, description will be made on a method of attaching the second connection members 50 and the spring member 60. As shown in FIG. 7, the spring member 60 (the second upstanding section 65) is flexed to widen the clearance between the body portion 61 and the second upstanding section 65. In this state, the second upstanding section 65 is inserted into the attachment hole 54 of each of the second connection members 50. Thereafter, the removal-preventing portion 63 kept in a flexed state is caused to pass through the attachment hole 54 in the order of the second upstanding section 65 and the first upstanding section 64 so that the attachment hole 54 can reach the arc-shaped engagement portion 62. As a consequence, the second connection members 50 and the spring member 60 are brought into engagement with each other. If the spring member 60 (the second upstanding section 65) is restored from the flexed state, the clearance between the body portion 61 and the second upstanding section 65 becomes equal to CL (see FIG. 6) and becomes smaller than the width W1 of the edge portion 54a of the attachment hole 54 of each of the second connection members 50.

Next, a component removal inhibiting action of the biasing mechanism unit 15 in accordance with the first embodiment will be described with reference to FIGS. 3 through 7.

As set forth above, if an external force larger than the biasing force of the biasing mechanism unit 15 is applied to the lower arm 12 or the end effecter 110 due to the interference with an external object or other causes, it is sometimes the case that the joint mechanism unit 20 (30) undergoes disengagement (called dislocation). In the prior art, if such is the case, the biasing force of the spring member 60 does not act between the first connection members 40, the second connection members 50, and the spring member 60 of the biasing mechanism unit 15 due to the disengagement of the joint mechanism unit 20 (30). For that reason, the first connection members 40, the second connection members 50, and the spring member 60 are disengaged from one another. It is therefore likely that the respective components are removed either independently or as a unit. In the first embodiment of the present invention, due to the aforementioned configuration, the first connection members 40, the second connection members 50, and the spring member 60 are hardly removed when the joint mechanism unit 20 (30) gets disengaged.

More specifically, as shown in FIG. 5, the protrusion portion 43 of each of the first connection members 40 protrudes toward and engages with the groove portion 16a of each of the attachment pins 16. In order to remove the first connection members 40 from the attachment pins 16, it is therefore necessary that a pulling force large enough to elastically deform the protrusion portion 43 so as to climb over the outer circumferential surface 16b formed at the tip end side of each of the attachment pins 16 be applied to each of the first connection members 40. For that reason, even if a pulling force is applied to each of the first connection members 40 in the event of disengagement of the joint mechanism unit 20 (30), the removal of the first connection members 40 is effectively inhibited by the engagement of the protrusion portion 43 and the groove portion 16a accompanied by elastic deformation.

As shown in FIG. 3, the shaft portions 41 of the first connection members 40 are inserted into the ring-shaped portions 52 (the hole portions 52a) of the second connection members 50. The removal-preventing portions 42 larger in diameter than the hole portions 52a are formed at the outer sides of the shaft portions 41. For that reason, the second connection members 50 and the first connection members 40 are not disengaged from each other unless the first connection members 40 are separated from the attachment pins 16. Accordingly, even if the biasing force of the spring member 60 does not act in the event of disengagement of the joint mechanism unit 20 (30), the removal of the second connection members 50 from the first connection members 40 is effectively inhibited.

As shown in FIGS. 3 and 4, the spring member 60 engages with the second connection members 50 in a state that the removal-preventing portion 63 (the first upstanding section 64 and the second upstanding section 65) passes through the attachment hole 54 with the engagement portion 62 inserted into the attachment hole 54. In order to remove the spring member 60 from the second connection members 50, it is therefore necessary to first pull out the engagement portion 62 from the attachment hole 54 until the base region of the first upstanding section 64 reaches the attachment hole 54. Then, the orientation of the spring member 60 needs to be changed by twisting the spring member 60 substantially at a right angle and the first upstanding section 64 needs to be removed from the attachment hole 54. It is also necessary to change the orientation of the spring member 60 by further twisting the spring member 60 substantially at a right angle. Then, the second upstanding section 65 needs to be removed from the attachment hole 54. At this time, the clearance CL between the body portion 61 and the second upstanding section 65 is smaller than the width W1 of the edge portion of the attachment hole 54 as shown in FIG. 6. It is therefore necessary to flex the spring member 60 and to increase the clearance between the body portion 61 and the second upstanding section 65 to the width W1 (see FIG. 7). It is less likely that these motions are naturally performed in the event of disengagement of the joint mechanism unit 20 (30). As a result, even if the biasing force of the spring member 60 does not act in the event of disengagement of the joint mechanism unit 20 (30), the removal of the spring member 60 from the second connection members 50 is effectively inhibited by the removal-preventing portions 63.

In the first embodiment, as described above, the biasing mechanism unit 15 is configured to include the first connection members 40 attached to the sockets 13 (14) of the lower arm 12. The first connection members 40 are configured to include the protrusion portions 43 for locking the first connection members 40 to the sockets 13 (14) of the lower arm 12. Thus, the first connection members 40 can be locked to the lower arm 12 by the protrusion portions 43. The biasing mechanism unit 15 can be attached to the lower arm 12 by the first connection members 40 locked to the lower arm 12. Accordingly, even if the spherical portions 22 (32) and the concave portions 13a (14a) of the joint mechanism unit 20 (30) are disengaged (dislocated) from each other, the protrusion portions 43 can keep the first connection members 40 of the biasing mechanism unit 15 hardly removed from the lower arm 12. It is therefore possible to inhibit the biasing mechanism unit 15 from being removed together with the first connection members 40. As a result, it is possible to reduce the likelihood of removal of components.

In the first embodiment, as described above, the first connection members 40 are formed into a tubular shape with the protrusion portions 43 provided on the inner circumferential surfaces of the first connection members 40. The attachment pins 16 for attaching the first connection members 40 are provided in the lower arm 12. The groove portions 16a engaging with the protrusion portions 43 of the first connection members 40 are provided on the outer circumferential surfaces of the attachment pins 16. Thus, the first connection members 40 can be easily locked to the sockets 13 (14) through the use of a simple structure for bringing the protrusion portions 43 of the first connection members 40 into engagement with the groove portions 16a of the attachment pins 16. Unlike an instance where the first connection members 40 are fixed through the use of a fastening member such as a bolt and a nut, there is no likelihood that screws are loosened and dropped by the operation of the parallel link robot 100. It is therefore possible to effectively reduce the likelihood of removal of components.

In the first embodiment, as described above, the first connection members 40 are made of an elastically deformable resin. The first connection members 40 are fitted to the attachment pins 16 while elastically deforming the protrusion portions 43. As the protrusion portions 43 are restored from the elastic deformation, the protrusion portions 43 and the groove portions 16a come into engagement with each other. Accordingly, even if a pulling force is applied to each of the first connection members 40 in the event of disengagement (dislocation) of the joint mechanism unit 20 (30), the removal of the first connection members 40 can be effectively inhibited by the engagement of the protrusion portions 43 and the groove portions 16a accompanied by elastic deformation.

In the first embodiment, as described above, the spring member 60 includes the engagement portions 62 attached to the attachment holes 54 of the second connection members 50 and provided with the removal-preventing portions 63 for inhibiting disengagement of the spring member 60 from the second connection members 50. Accordingly, the removal of the spring member 60 from the second connection members 50 can be effectively inhibited by the removal-preventing portions 63 even in the event of disengagement of the joint mechanism unit.

In the first embodiment, as described above, each of the removal-preventing portions 63 of the spring member 60 is provided with the first upstanding section 64 and the second upstanding section 65 and is bent in a plurality of different directions. Accordingly, the spring member 60 is not removed from the second connection members 50 unless the orientation of the spring member 60 is changed a multiple number of times in conformity with the bent directions of the removal-preventing portions 63. As a result, the removal of the spring member 60 from the second connection members 50 can be inhibited in an easy and effective manner.

In the first embodiment, as described above, the width W1 of the edge portion 54a surrounding the attachment hole 54 of each of the second connection members 50 in the direction orthogonal to the attachment direction is larger than the clearance CL between the removal-preventing portion (the second upstanding section 65) and the body portion 61 of the spring member 60. Accordingly, the spring member 60 is not removed from the second connection members 50 unless the spring member 60 is flexed to increase the clearance between the body portion 61 and the second upstanding section 65 to the width W1. As a result, the removal of the spring member 60 from the second connection members 50 can be more effectively inhibited without having to increase the number of components.

In the first embodiment, as described above, the first slant surface portion 16c whose width (diameter) grows smaller toward the tip end of each of the attachment pins 16 is provided in the tip end portion of each of the attachment pins 16. Accordingly, when fitting the first connection members 40, the protrusion portion 43 on the inner circumferential surface of each of the first connection members 40 can be brought into contact with the first slant surface portion 16c, thereby elastically deforming the protrusion portion 43 in a gradual manner. For that reason, despite the fact that protrusion portion 43 is provided in each of the first connection members 40, it is possible to attach the first connection members 40 without having to apply an excessively large pressing force to the first connection members 40.

In the first embodiment, as described above, each of the second connection members 50 is provided with the ring-shaped portions 52. Each of the first connection members 40 is provided with the shaft portion 41 to which each of the ring-shaped portions 52 is fitted and the removal-preventing portion 42 formed at the axial outer side of the shaft portion 41. The removal-preventing portion 42 has an outer diameter D7 larger than the inner diameter (the longer diameter) D8 of each of the ring-shaped portions 52. Accordingly, the second connection members 50 and the first connection members 40 are not disengaged from each other unless the first connection members 40 are separated from the sockets 13 (14) of the lower arm 12. It is therefore possible to effectively reduce the likelihood of removal of components.

In the first embodiment, as described above, each of the ring-shaped portions 52 of the second connection members 50 is fitted to the outer surface of the shaft portion 41 of each of the first connection members 40. Each of the attachment pins 16 is fitted to the inner surface of the shaft portion 41. Accordingly, the task of attaching the first connection members 40 to the lower arm 12 (the attachment pins 16) and the task of attaching the second connection members 50 to the first connection members 40 can be performed at one time by merely fitting the shaft portions 41 of the first connection members 40 to the attachment pins 16 through the inner surfaces of the ring-shaped portions 52 of the second connection members 50. This makes it possible to improve the workability in attaching the biasing mechanism unit 15.

In the first embodiment, as described above, the first connection members 40 are made of a resin. The second connection members 50 are made of metal (stainless steel). In the biasing mechanism unit 15, the resin-made washers 70 are arranged at the opposite sides of each of the second connection members 50 from the removal-preventing portions 42 of the first connection members 40. Accordingly, each of the second connection members 50 is surrounded by the resin-made shaft portion 41, the resin-made removal-preventing portion 42, and the resin-made washers 70. It is therefore possible to inhibit the metal-made second connection members 50 from making contact with other metallic components (the sockets 13 and so forth) and undergoing wear.

Second Embodiment

Next, a second embodiment of the present invention will be described with reference to FIGS. 8 through 10. In the second embodiment, description will be made on the configuration of a biasing mechanism unit 115 differing from the biasing mechanism unit 15 of the first embodiment. Other configurations than the biasing mechanism unit 115 are the same as those of the first embodiment and, therefore, will not be described herein. In the biasing mechanism unit 115, the same portions as those of the first embodiment will be designated by like reference symbols with no description made thereon.

Figure 8:
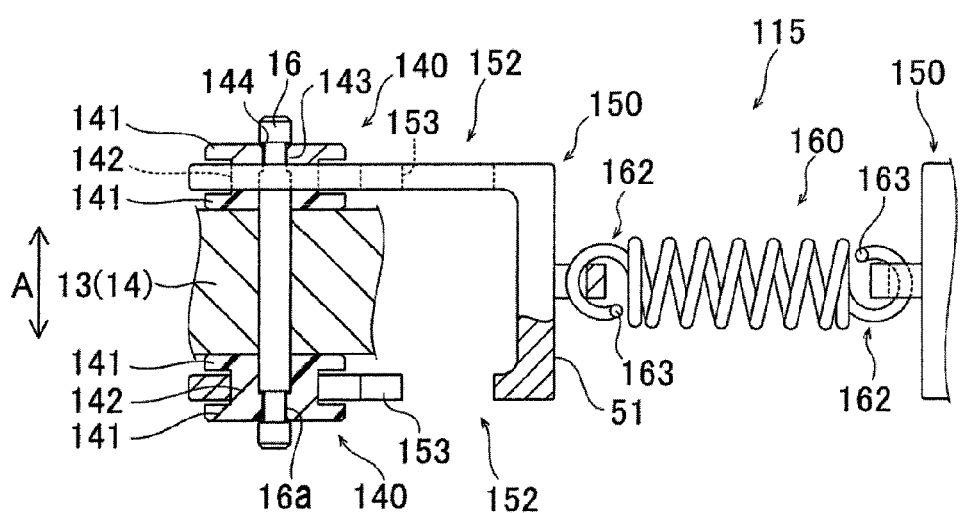
FIG. 8 is a schematic view for explaining a biasing mechanism unit of the parallel link robot according to the second embodiment of the present invention.
Figure 10:
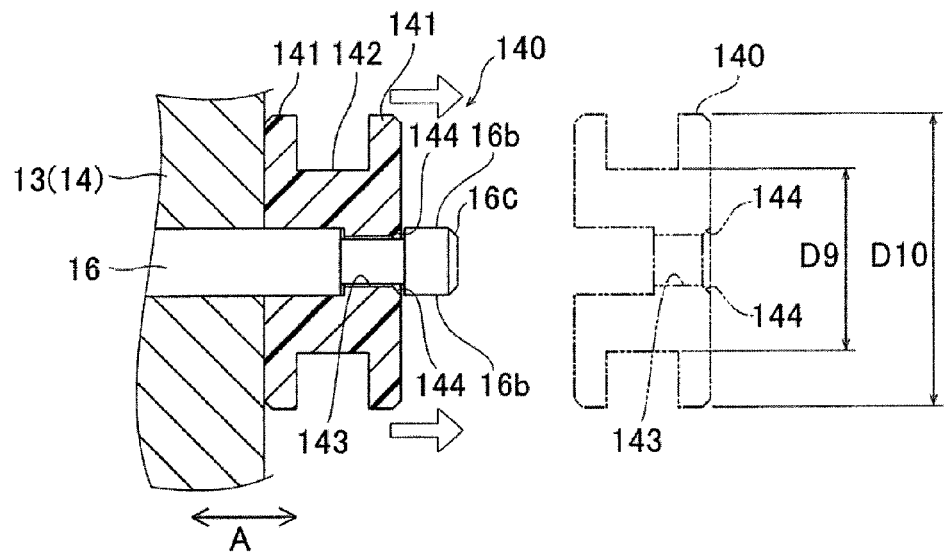
FIG. 10 is a schematic enlarged section view for explaining the first connection member of the biasing mechanism unit of the second embodiment shown in FIG. 8.

In the second embodiment, as shown in FIGS. 8 and 10, large diameter portions 141 having a large outer diameter D10 are formed in the axial opposite side regions of the outer circumferential surface of each of the first connection members 140. A small diameter portion 142 having a small diameter D9 smaller in diameter than the large diameter portions 141 is formed in the axial central region of the outer circumferential surface of each of the first connection members 140. In the second embodiment, a second slant surface portion 144 is formed in a protrusion portion 143 of each of the first connection members 140. The second slant surface portion 144 is provided in the attachment-direction rear end region of the protrusion portion 143 (in the outer region of the protrusion portion 143 in the axial direction (the direction indicated by an arrow A)). The second slant surface portion 144 is formed to have a width (diameter) growing larger toward the tip end of each of the attachment pins 16. The protrusion portion 143 is one example of a "first locking portion" of the present invention.

Figure 9:
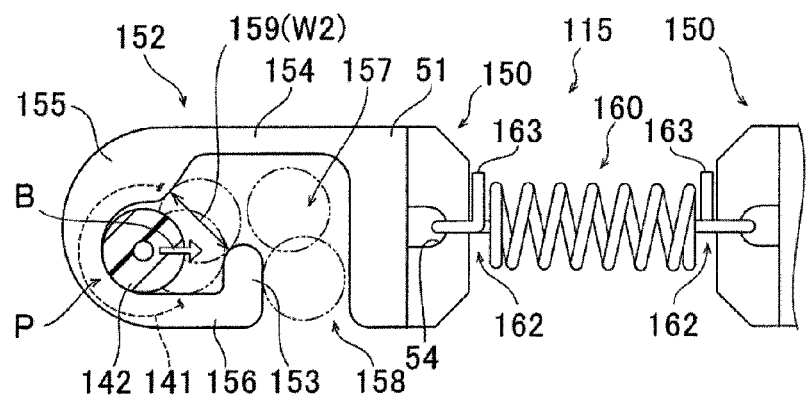
FIG. 9 is a side view schematically illustrating the biasing mechanism unit of the parallel link robot according to the second embodiment of the present invention.

As shown in FIGS. 8 and 9, each of the second connection members 150 includes a pair of hook portions 152 bifurcated from a base portion 51. Each of the hook portions 152 extending from the base portion 51 is bent into an arc shape so as to partially surround each of the first connection members 140. Each of the hook portions 152 includes a lug portion 153 for inhibiting each of the hook portions 152 from being disengaged from each of the first connection members 140. The lug portion 153 is one-piece formed with each of the hook portions 152. The lug portion 153 is one example of a "third removal-preventing portion" of the present invention.

Each of the hook portions 152 has a substantially J-like shape and includes a first section 154 extending from the base portion 51, a second section 155 extending around each of the first connection members 140 (the small diameter portion 142) in the engaging position P, and a third section 156 extending from the second section 155 toward the base portion 51. The lug portion 153 extends from the tip end (the end near the base portion 51) of the third section 156. The lug portion 153 is bent substantially at a right angle with respect to the third section 156 and is formed to protrude toward the inside of each of the hook portions 152 (toward the first section 154).

A passage portion 157 defined by the base portion 51, each of the hook portions 152, and the lug portion 153 is formed in each of the second connection members 150. The small diameter portion 142 (having an outer diameter D9) of each of the first connection members 140 can pass through the passage portion 157. The width (passage width) of the passage portion 157 is smaller than the outer diameter D10 (see FIG. 10) of the large diameter portions 141. By relatively moving each of the first connection members 140 and each of the second connection members 150, it is possible to move each of the first connection members 140 (the small diameter portion 142) toward the inside of each of the hook portions 152 through an opening portion 158 formed between the third section 156 of each of the hook portions 152 and the base portion 51. This makes it possible to relatively move each of the first connection members 140 (the small diameter portion 142) to the engaging position P. If the small diameter portion 142 is arranged inside each of the hook portions 152, the large diameter portions 141 are positioned at the opposite sides of each of the hook portions 152 in the axial direction (the direction indicated by an arrow A), thereby preventing each of the hook portions 152 from moving in the axial direction (preventing removal of each of the second connection members 150).

In the second embodiment, the lug portion 153 is arranged between the engaging position P and the opening portion 158 (at the tip end of the third section 156) so as to obstruct the movement of each of the first connection members 140 from the engaging position P in the disengaging direction (the direction indicated by an arrow B). The passage portion 157 extends around the lug portion 153 in the route running from the opening portion 158 to the engaging position P. Thus, the passage portion 157 is bent in a plurality of different directions.

As shown in FIG. 9, the passage portion 157 includes a narrow neck section 159 defined between the lug portion 153 and the inner circumferential surface of the second section 155. The neck section 159 is formed to have a passage width W2 substantially equal to the outer diameter D9 of the small diameter portion 142 of each of the first connection members 140.

As shown in FIGS. 8 and 9, the spring member 160 includes engagement portions 162 formed into an arc shape and removal-preventing portions 163 bent vertically upward from the engagement portions 162. The spring member 160 is configured to engage with the second connection members 150 in a state that the removal-preventing portions 163 pass through the attachment holes 54 with the engagement portions 162 inserted into the attachment holes 54. Each of the removal-preventing portions 163 is one example of a "first removal-preventing portion" of the present invention.

Other configurations of the second embodiment remain the same as those of the first embodiment.

Next, the operation of the biasing mechanism unit 115 in accordance with the second embodiment will be described with reference to FIGS. 8 through 10.

The second embodiment is the same as the first embodiment in that the removal of the first connection members 140 is inhibited by the engagement of the protrusion portion 143 of each of the first connection members 140 and the groove portion 16a of each of the attachment pins 16.

In the second embodiment, as shown in FIG. 10, when the first connection members 140 are removed to replace the same, the second slant surface portion 144 of the protrusion portion 143 climbs on the outer circumferential surface 16b of each of the attachment pins 16. Thus, the protrusion portion 143 is elastically deformed in a gradual manner. For that reason, no excessively large force is needed in removing the first connection members 140 for maintenance purposes. The width and protruding amount of the protrusion portion 143 and the shape of the second slant surface portion 144 are appropriately set in view of the magnitude of a pulling force that can act in the event of disengagement of the joint mechanism unit 20 (30). As a consequence, the first connection members 140 are locked with a suitable locking force which ensures that the first connection members 140 are not removed during the operation of the parallel link robot (in the event of disengagement of the joint mechanism unit 20 (30)) and further that the first connection members 140 can be removed for maintenance purposes as a worker intentionally applies a force.

As shown in FIG. 9, the lug portion 153 of each of the second connection members 150 protrudes toward the inside of each of the hook portions 152 so as to obstruct the movement of each of the first connection members 140 from the engaging position P. Therefore, if an attempt is made to disengage the second connection members 150 and the first connection members 140 from each other, each of the first connection members 140 comes into contact with the lug portion 153. Thus, the movement of each of the first connection members 140 in the disengaging direction (the direction indicated by an arrow B) is obstructed. Since the passage portion 157 is bent in a plurality of different directions due to the existence of the lug portion 153 and the hook portion 152, the second connection members 150 and the first connection members 140 need to be relatively moved in order to move each of the first connection members 140 to the opening portion 158 along the curvature of the passage portion 157. Since the neck section 159 of the passage portion 157 has the passage width W2 substantially equal to the outer diameter D9 (see FIG. 10) of the small diameter portion 142 of each of the first connection members 140, it is difficult for each of the first connection members 140 to pass through the neck section 159. Therefore, even if the biasing force of the spring member 160 does not act in the event of disengagement of the joint mechanism unit 20 (30), the removal of the second connection members 150 from the first connection members 140 is effectively inhibited.

In order to remove the spring member 160 from the second connection members 150 as shown in FIGS. 8 and 9, it is necessary to first pull out the engagement portion 162 from the attachment hole 54 until the base region of the removal-preventing portion 163 reaches the attachment hole 54. Then, the orientation of the spring member 160 needs to be changed by twisting the spring member 160 substantially at a right angle and the removal-preventing portion 163 needs to be removed from the attachment hole 54. For that reason, it is less likely that the engagement portion 162 and the removal-preventing portion 163 are both naturally removed from the attachment hole 54 of the correspondingly second connection member 150 in the event of disengagement of the joint mechanism unit 20 (30). Therefore, even if the biasing force of the spring member 160 does not act in the event of disengagement of the joint mechanism unit 20 (30), the removal of the spring member 160 from the second connection members 150 is effectively inhibited.

In the second embodiment, as described above, the second slant surface portion 144 is provided in the attachment-direction rear end region of the protrusion portion 143 of the first connection member 140 (in the outer region of the protrusion portion 143 in the axial direction (the direction indicated by an arrow A)). The second slant surface portion 144 is formed to have a width (diameter) growing larger toward the tip end of the attachment pin 16. Accordingly, when removing each of the first connection members 140, the second slant surface portion 144 of the protrusion portion 143 climbs on the outer circumferential surface 16b of each of the attachment pins 16 and undergoes gradual elastic deformation. For that reason, no excessively large force is needed in removing the first connection members 140. As a consequence, the first connection members 140 can be locked to the lower arm 12 (the attachment pins 16) with a suitable locking force which ensures that the first connection members 140 are not removed in the event of disengagement (dislocation) of the joint mechanism unit 20 (30) and further that the first connection members 140 can be removed for maintenance purposes as a worker intentionally applies a force.

In the second embodiment, as described above, each of the second connection members 150 includes the lug portion 153 for inhibiting disengagement and the hook portions 152 for surrounding the outer circumferential surface of the first connection members 140. Accordingly, the disengagement of the second connection members 150 and the first connection members 140 can be inhibited by the lug portions 153. As a result, it is possible to more effectively reduce the likelihood of removal of components.

In the second embodiment, as described above, the lug portion 153 protruding toward the inside of each of the hook portions 152 is provided so as to obstruct the movement of each of the first connection members 140 relative to each of the second connection members 150 in the disengaging direction (the direction indicated by an arrow B). Accordingly, even if each of the first connection members 140 is moved with respect to each of the second connection members 150 in the disengaging direction, the lug portion 153 comes into contact with each of the first connection members 140, thereby obstructing the movement of each of the first connection members 140. As a result, the disengagement of the second connection members 150 and the first connection members 140 can be inhibited with ease. Other effects of the second embodiment are the same as those of the first embodiment.

Figure 11:
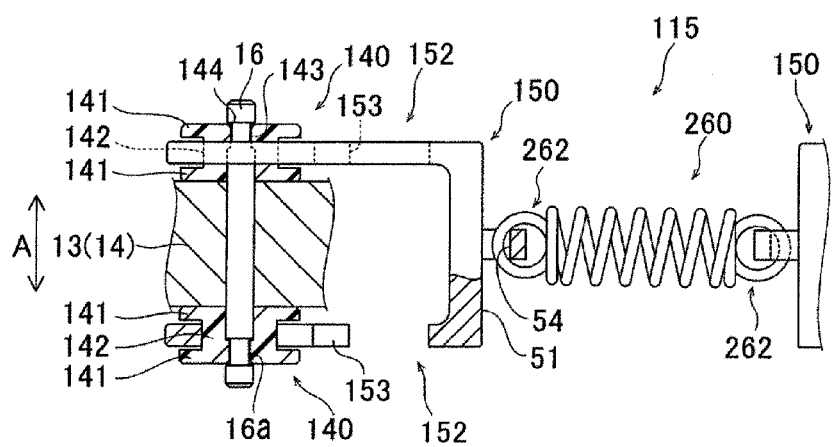
FIG. 11 is a schematic view for explaining the biasing mechanism unit according to a modified example of the second embodiment of the present invention.

In a modified example of the second embodiment, as shown in FIG. 11, the second connection members 150 and the spring member 260 are connected by forming engagement portions 262 into a ring shape in a state that the engagement portions 262 are connected to the attachment holes 54 of the second connection members 150. With this configuration, it is possible to further reduce the likelihood that the second connection members 150 and the spring member 260 are separated from each other during the operation of the parallel link robot. Each of the engagement portions 262 is one example of a "first removal-preventing portion" of the present invention.

It should be appreciated that the embodiments disclosed herein are illustrative and are not limitative in all respects. The scope of the present invention is defined, by the claims and not by the foregoing description on the embodiments. All the modifications made within the meaning and scope equivalent to the claims are included in the scope of the present invention.

For example, while the parallel link robot provided with three arm units has been described as one example of the parallel link robot of the present invention, the present invention is not limited thereto. In the present invention, it may possible to employ a parallel link robot provided with two arm units or four or more arm units.

While the first connection members are attached to the sockets of the lower arm in the first and second embodiments, the present invention is not limited thereto. In the present invention, the first connection members may be attached to the poles of the lower arm so that the biasing mechanism unit can bias the concave portions of the sockets toward the spherical portions through the poles.

While the spherical portions are provided in the upper arm and the sockets (the concave portions) and the biasing mechanism unit are provided in the lower arm in the first and second embodiments, the present invention is not limited thereto. In the present invention, the spherical portions may be provided in the lower arm and the sockets (the concave portions) and the biasing mechanism unit may be provided in the upper arm.

While the tubular first connection members are fitted to the attachment pins in the first and second embodiments, the present invention is not limited thereto. For example, tubular attachment members may be provided in place of the attachment pins and the first connection members may be fitted to the insides of the tubular attachment members.

While the protrusion portions are provided in the first connection members and the groove portions are provided in the attachment pins in the first and second embodiments, the present invention is not limited thereto. In the present invention, the groove portions may be provided in the first connection members and the protrusion portions may be provided in the attachment pins.

While the second connection members are attached to the first connection members and the spring member is attached to the second connection members in the first and second embodiments, the present invention is not limited thereto. In the present invention, the spring member may be directly attached to the first connection members without having to provide the second connection members.

While the first slant surface portions are provided in the tip end portions of the attachment pins in the first and second embodiments, the present invention is not limited thereto. In the present invention, the first slant surface portions may be provided in the attachment-direction tip end portions of the protrusion portions of the first connection members so that the first slant surface portions of the protrusion portions can make contact with the attachment pins when the first connection members are fitted to the attachment pins. Alternatively, the first slant surface portions may be provided in the tip end portions of the attachment pins and in the attachment-direction tip end portions of the protrusion portions.

While the second slant surface portions are formed in the attachment-direction rear end portions of the protrusion portions of the first connection members in the first and second embodiments, the present invention is not limited thereto. In the present invention, the second slant surface portions may be provided in the groove portions of the attachment pins so that the second slant surface portions of the groove portions can make contact with the protrusion portions of the first connection members when the first connection members are removed from the attachment pins. Alternatively, the second slant surface portions may be provided in the groove portions of the attachment pins and in the attachment-direction rear end portions of the protrusion portions.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A parallel link robot, comprising:
   a first arm including a first joint portion;
   a second arm including a second joint portion swingably engaging with the first joint portion, the second arm being connected to the first arm to make up a link mechanism; and
   a biasing mechanism unit which biases the second joint portion toward the first joint portion,
   wherein the biasing mechanism unit includes a connection member attached to the second arm, the connection member including a locking portion configured to lock the connection member to the second arm;
   wherein the locking portion includes a first locking portion, the connection member being formed into a tubular shape to have an inner circumferential surface, the first locking portion being made up of a protrusion portion or a groove portion and being provided on the inner circumferential surface of the connection member, and
   wherein the second arm includes an attachment pin configured to attach the connection member, the attachment pin having an outer circumferential surface and a second locking portion provided on the outer circumferential surface and made up of a groove portion or a protrusion portion, the second locking portion being engaged with the first locking portion.

2. The robot of claim 1, wherein the connection member is made of an elastically deformable resin, the connection member being fitted to the attachment pin while elastically deforming the first locking portion, the first locking portion and the second locking portion being configured to engage with each other as the first locking portion is restored from elastic deformation.

3. The robot of claim 1, wherein the connection member includes a first connection member,
   the biasing mechanism unit further includes a second connection member engaging with the first connection member attached to the second arm, and
   a spring member engaging with the second connection member and biasing the second joint portion toward the first joint portion, the spring member including engagement portions attached to attachment portions of the second connection member, each of the engagement portions having a removal-preventing portion configured to inhibit the spring member from being disengaged from the second connection member.

4. The robot of claim 3, wherein the removal-preventing portion is bent in a plurality of different directions.

5. The robot of claim 3, wherein each of the attachment portions of the second connection member includes an attachment hole, the spring member further including a spring body portion, the engagement portions being provided at the opposite ends of the spring body portion, the second connection member including a surrounding portion which surrounds the attachment hole, the width of the surrounding portion in a direction orthogonal to an attachment direction being larger than a clearance between the removal-preventing portion and the spring body portion.

6. The robot of claim 1, wherein a slant surface portion is provided in at least one of an attachment-direction tip end portion of the first locking portion of the connection member and a tip end portion of the attachment pin.

7. The robot of claim 1, wherein a slant surface portion is provided in at least one of an attachment-direction rear end portion of the first locking portion of the connection member and the second locking portion of the attachment pin.

8. The robot of claim 1, wherein the connection member includes a first connection member, the biasing mechanism unit further including a second connection member engaging with the first connection member attached to the second arm, the second connection member including a ring-shaped portion, the first connection member including a shaft portion to which the ring-shaped portion is fitted and a removal-preventing portion provided at an axial outer region of the shaft portion, the removal-preventing portion having an outer diameter larger than an inner diameter of the ring-shaped portion.

9. The robot of claim 8, wherein shaft portion of the first connection member being formed into a tubular shape, the ring-shaped portion of the second connection member being fitted to an outer surface of the shaft portion, the attachment pin being fitted to an inner surface of the shaft portion.

10. The robot of claim 8, wherein the first connection member is made of a resin,
the second connection member is made of metal, and
the biasing mechanism unit further includes resin-made washers arranged at the opposite sides of the second connection member from the removal-preventing portion.

11. The robot of claim 1, wherein the connection member includes a first connection member, and
the biasing mechanism unit further includes a second connection member engaging with the first connection member attached to the second arm, the second connection member including a hook portion provided to surround an outer circumferential surface of the first connection member, the hook portion including a removal-preventing portion for inhibiting disengagement.

12. The robot of claim 11, wherein the removal-preventing portion is formed to protrude toward an inside of the hook portion so as to obstruct movement of the first connection member in a disengaging direction with respect to the second connection member.

* * * * *